T. F. HAMILTON.
Combined Spider, Skillet, and Gridiron.

No. 100,397.                          Patented Mar. 1, 1870.

Witnesses.                          Inventor.

Thos. Foster Hamilton
by Prindle & Dyer, Attys.

United States Patent Office.

THOMAS FOSTER HAMILTON, OF GENESEO, ILLINOIS.

Letters Patent No. 100,397, dated March 1, 1870.

COMBINED SPIDER, SKILLET, AND GRIDIRON.

The Schedule referred to in these Letters Patent and making part of the same.

*To all whom it may concern:*

Be it known that I, THOMAS FOSTER HAMILTON, of Geneseo, in the county of Henry, and State of Illinois, have invented certain new useful Improvements in Cooking-Utensils; and do hereby declare the following to be a full, clear, and exact description thereof, reference being had to the accompanying drawing making a part of this specification, in which—

Letters of like name and kind refer to like parts in each of the figures.

My invention has for its object the production of a simple, cheap, and convenient cooking-utensil for use in place of the ordinary skillet, spider, and gridiron; and to this end It consists in combining with a shallow metal pan, a plain, a corrugated, and a barred bottom, substantially as shown, and for the purpose specified.

In the annexed drawing—

A represents a shallow metal pan having the general form of an ordinary skillet, and provided with a cover, B, and handle C.

In and through the bottom D of the pan A is provided a circular opening, E, having a diameter equal to about two-thirds of the size of said bottom, and provided with a flange, e, projecting upward from and extending around the edge of said opening.

F represents a false or removable bottom corresponding with and fitting over the opening E; a flange, f, being provided upon its edge, which, extending downward, embraces the upward flange e, and firmly unites said false and real bottoms.

A perforated lug or ear, G, projecting horizontally outward from one edge of the bottom F, permits the insertion of an ordinary lid-lifter, by means of which said bottom may be adjusted to or removed from the pan.

Figure 1:
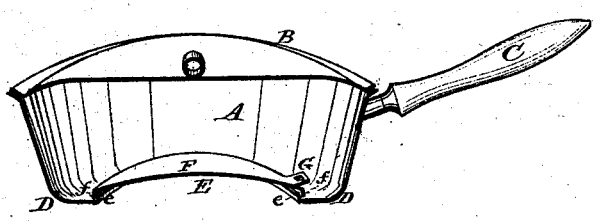
Figure 1 is a vertical central section of my improved device.
Figure 2:
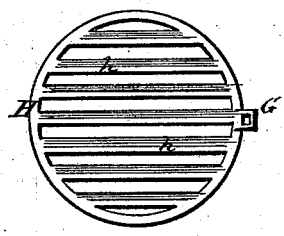
Figure 2 is a plan view of a gridiron attachment for the same.

In fig. 2 is shown another detachable bottom, H, corresponding in its general form with that hereinbefore described, and fitting over the opening C in a like manner, but having its central portion composed of a series of parallel bars, h, separated by openings of a corresponding width and shape, and grooved upon their upper sides.

Figure 3:
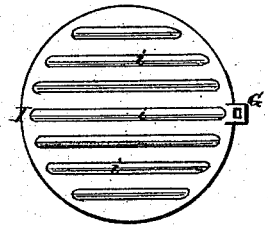
Figure 3 is a like view of a corrugated bottom made interchangeable with said gridiron.

In fig. 3 is shown still another form of false bottom, I, having a convex top provided with a series of parallel corrugations or ribs, i, and made adjustable to the pan A, like those previously described.

As thus constructed the device is complete, and its operation and advantages are as follows:

For use as a skillet or spider, the plain bottom F will be employed, and, being caused to fit closely over the opening D, will be found almost if not entirely equal to the ordinary solid bottom of a spider.

For broiling meat, either the barred or the corrugated bottoms may be used, although when a sufficient draught is had, the former will be found most desirable, as the fumes of the meat will be drawn downward into the fire, and one hitherto serious annoyance thus avoided.

The upper surface of each bar $h$ and of the bottom I being grooved, it will be seen that the melted fat, butter, &c., will pass downward to either side of the spider and be retained within the space between its walls and the flange, from whence it may be poured into a suitable vessel when the meat is cooked, by which means a great saving is effected over the ordinary method of broiling meat, in which said gravy is principally wasted by running upon and into the stove.

While possessing all of the advantages of three heretofore separate utensils, this device can be furnished at one-half their usual cost, besides which a considerable saving is caused in weight and space.

Having thus fully set forth the nature and merits of my invention,

What I claim as new, and desire to secure by Letters Patent, is—

The hereinbefore-described device, consisting of the pan A provided with the opening E and flange e, in combination with the detachable bottoms F H or I, all constructed and arranged substantially as and for the purpose specified.

Also, a spider provided with a detachable bottom, substantially as and for the purpose set forth.

In testimony whereof, I have signed my name to this specification in the presence of two subscribing witnesses.

THOMAS F. HAMILTON.

Witnesses:
G. W. LAWBAUGH,
GEO. V. WELLS.